Figure 1:
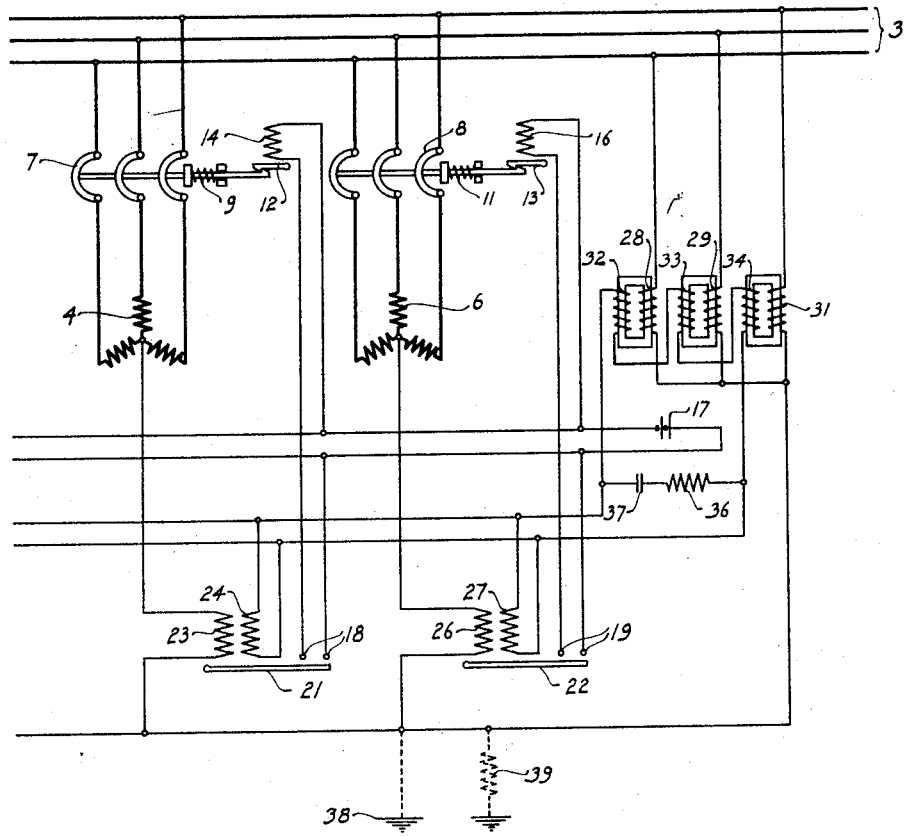

March 28, 1933.　　　J. JONAS　　　1,903,001

PROTECTIVE SYSTEM

Filed Jan. 18, 1930

Inventor
Julius Jonas
By (signature)
Attorney

Patented Mar. 28, 1933

1,903,001

UNITED STATES PATENT OFFICE

JULIUS JONAS, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

PROTECTIVE SYSTEM

Application filed January 18, 1930, Serial No. 421,677, and in Germany January 21, 1929.

This invention relates to improvements in electric protective systems and, particularly, to systems for protecting polyphase electrical windings with a neutral point, which windings are connected in parallel to a common conductor, from damage and disturbance to the field symmetry.

If electrical devices such as alternating current generators, having commonly connected neutral points, are to be protected from winding or frame short circuits, reactances are usually connected between the common connection point and the neutral point. The reactances are connected to the same network as the generators and operate relays for opening the generator switches. If a disturbance now occurs due to a winding short circuit in one of the generators, with a plurality of generators operating on a common network, a disturbance in one of the generators causes an equalizing current to flow through all of the reactances and relays thereby operating all of the relays which precludes all possibility of selective action. A selective relay operation can take place only if each of the generators and the accompanying reactances are insulated.

Even relays, operated by a function of current and voltage, in the nature of a wattmeter as proposed heretofore, are useless to provide for a selective action for the reason that a third harmonic flows between the neutral points and the reactances when a short circuit or dissymmetry of any kind occurs. If the linked voltage of two different windings is supplied to the voltage coil of such relay, the third harmonic component is not present and the relays are accordingly not operated. In view, however, of the fact that the vectoral direction of the fault current with respect to the direction of the desired equalizing voltage is not in a predetermined certain relation, the operation of the relay may be made dependent only on the strength of the fault current and not on the direction thereof. For this reason any protective system of the above described character, in spite of the use of relays having a wattmeter action, is not adapted to secure selective protective action.

The proper selective protective action may be attained in a system having parallel operating windings by connecting single phase auxiliary transformers to the conductors in such number as to correspond to the number of phases of the network in parallel to the windings to be protected. The one end of each of the primary windings of the transformers are to be connected to the common neutral point of the windings to be protected while the other ends of the primary windings of the transformer are to be connected to different phase conductors of the network. The secondary windings of the transformer are connected in series opposed to each other so that, when the phase voltage is equal in the primary windings, the voltage in the entire series of secondary windings is equal to zero. The primary winding neutral point of these auxiliary transformers is to be connected with the neutral point of all of the windings connected in parallel to the network and the current coils of relays in the nature of a wattmeter, that is, having a current and a voltage coil, are to be connected in the connection between the neutral point of each winding and the connection point. The voltage coils of the several relays are supplied from the secondary windings of the auxiliary transformer group so that each one of the relays may become operative in dependence on direction of the energy flow in the system.

It is, therefore, among the objects of the present invention, to provide a selective protective system for the windings of electrical devices which have a neutral point by the use of a relay connected between the neutral point of each winding and the common connection point of all of such neutral points.

Another object of the present invention is to provide an electrical protective system for parallel connected polyphase devices which will have a selective action due to the fact that relays are used which are operative in dependence on both the direction and the strength of the fault current operating the same.

Figure 2:
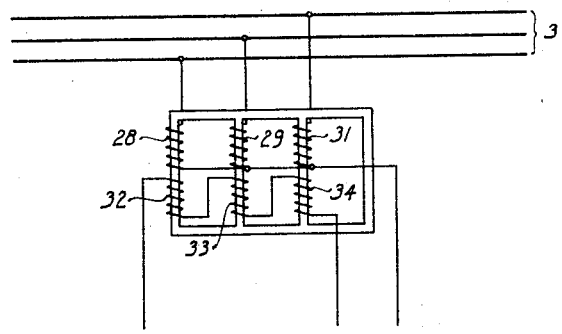

Objects and advantages, other than those above set forth, will be apparent from the following description, and the drawing in which Figure 1 shows a schematic embodiment of the present invention, and Fig. 2 is a diagrammatic showing of a three phase transformer which may be used in place of the three single-phase transformers shown in Fig. 1.

Referring more particularly to the drawing by characters of reference, the reference numeral 3 indicates a polyphase line which may supply or may be supplied by polyphase apparatus 4 and 6 such as transformers or generators. The polyphase apparatus 4, 6 is connected, in parallel, to the polyphase line 3 by means of circuit breakers 7, 8 normally retained in the closed position, against the compression springs 9, 11, by means of latches 12, 13 each forming an armature for a releasing coil 14, 16. The releasing coils 14, 16 for the circuit breakers 7, 8 are connected to be energized from a suitable current source 17, the flow of current from which is controlled by pairs of contacts 18, 19 for each of the coils 14, 16. The pairs of contacts 18, 19 are arranged to be bridged by armatures 21, 22 forming a portion of a relay each having a current coil 23, 26 and a voltage coil 24, 27.

Single phase transformers equal in number to the number of line phases are connected to the line i. e., a single phase transformer is connected to each phase. Each transformer includes a core wound with a primary as indicated at 28, 29 and 31 and a secondary as indicated at 32, 33 and 34. The primaries of the single phase transformers are connected in star to provide a common neutral point therefor and the secondaries of the transformers are connected in delta. The neutral point of the single phase transformers is connected with the neutral point of the polyphase apparatus 4, 6, through the relay current coils 23, 26. The secondaries of the single phase transformers are connected with the voltage coils 24, 27 and are bridged by a resonant circuit formed by a reactance 36 and a capacitance 37 which circuit is tuned to eliminate any evidences of a third harmonic which may occur in the system. The neutral point connection may be grounded directly as indicated at 38 or may be grounded through a choke coil as indicated at 39.

In normal operation, as long as the phase voltages in the primary windings 28, 29 and 31 of the single phase transformers are equal in value, the voltage in the delta connected secondary winding 32, 33 and 34 of the single phase transformer is zero. The potential of the neutral point connection is then the neutral potential of the network. The neutral point of the primary windings of the single phase transformers being connected with the neutral point connection for the apparatuses 4, 6 this point also is at the neutral potential of the network 3 and the voltages connected to the several primary windings are, therefore, the phase voltages of a symmetrical voltage system and are accordingly of equal value. If the several single phase transformers have the same number of ampere turns, the delta connected secondary windings will also be at the same voltages. These voltages have such phase angles with respect to each other, in a symmetrical voltage system, that the resulting voltage of the delta connected secondaries is equal to zero. The above voltage conditions are, however, immediately changed if a short circuit occurs in either apparatus 4 or 6. For example, a short circuit in apparatus 4 causes the voltage in the short circuited phase to drop and the voltage neutral point of that phase is displaced thereby causing a circulating current to flow from the neutral point of the damaged winding or apparatus to the neutral point of the sound winding or apparatus. Such circulating current causes displacement of the neutral point of the sound windings and also causes displacement of the neutral point of the single phase transformer primaries. The neutral point displacement of the transformer primaries is accelerated by the fact that the magnetic circuit of the single phase transformers are not linked. The voltages of the primary windings of the single phase transformers are not equal any longer and, accordingly, a voltage occurs in the delta connected secondary windings, the phase angle of which voltage is determined by the direction of the circulating current and is therefore dependent on which of the winding phases of the affected apparatus contains the short circuit. The circulating current will accordingly flow through the current coils 23, 26 in opposite direction. These current coils are so arranged with relation to the voltage coils 24, 27 that the phases of the voltages in the voltage coils are momentarily in the same relation to the phases of the equalizing or circulating current. The armature 21 will accordingly be attracted to close the contacts 18 thereby closing the circuit from the source of current 17 to the coil 14 which attracts armature-latch 12 and permits circuit breaker 7 to open.

The relays are prevented from operating on any third harmonic current by the action of the resonant circuit including the reactance 36 and the capacitance 37 connected across the terminals of the series connected secondary winding of the single phase transformers. The relays are accordingly dependent on the direction of the current flow so that the proper circuit breaker is caused to operate to cut out the damaged winding or machine.

It may, therefore, be readily seen that the described system operates selectively to cut out any apparatus having a fault, such as winding or frame short circuits or grounds, which would cause a disturbance of the phase symmetry. The system does not, however, operate in case of a short circuit in the polyphase lines only. The system is not dependent merely on the amount but also on the direction of the current so that an apparatus is disconnected immediately upon the occurrence of a fault therein.

In case it is desirable to use a single transformer structure instead of three separate single phase transformers, a single four-legged core may be provided with the primary windings 28, 29 and 31 again connected in star and the secondary windings 32, 33 and 34 again connected in delta. The fourth unwound leg of the transformer core is then used to furnish a path for the interlinkage of the flux of the several wound legs of the core. If desired a winding may also be provided on the fourth leg from which the voltage supplied to the voltage coils of the relays may be taken instead of taking such voltage from the delta connected secondary as above described. The current coil of the relays may also be excited directly or indirectly by shunt or current transformers from the current in the neutral point connection.

Although but one embodiment of this invention has been illustrated and described, it will be understood that various other embodiments are possible and that various changes may be made without departing from the spirit of the invention or the scope of the appended claims.

The invention claimed is:

1. In a system for selectively protecting electrical devices from short circuits, a polyphase line, a plurality of polyphase electrical devices each having a neutral point, said devices each being connected to said line, and common means connected between the neutral point of each of said devices and said line for selectively causing the disconnection from said line of any one said devices upon the occurrence of a fault therein.

2. In a system for selectively protecting electrical devices from short circuits, a polyphase line, a plurality of polyphase electrical devices having a neutral point, said devices being connected in parallel to said line, and common means individual to each of said devices connected between the neutral point thereof and said line for selectively causing disconnection from said line of the corresponding one of said devices upon the occurrence of a fault in such said device.

3. In a system for selectively protecting electrical devices from short circuits, a polyphase line, a plurality of polyphase electrical devices having a neutral point, said devices being connected in parallel to said line, a circuit breaker interposed between each of said devices and said line effective to permit connection and disconnection of said devices with and from said line, and common means connected between the neutral point of each of said devices and said line for selectively causing actuation of said circuit breakers upon disturbance of the field symmetry in said devices to selectively effect disconnection of said devices from said line.

4. In a system for selectively protecting electrical devices from short circuits and similar disturbances, a polyphase line, a plurality of polyphase electrical devices each having a neutral point, said devices being connected in parallel to said line, a circuit breaker interposed between each of said devices and said line to permit disconnection of the associated one of said devices therefrom, a transformer structure connected between said line and the neutral points of said devices, and common means individual to each of said devices connected with the said transformer structure and the respective said circuit breakers for causing selective actuation of said circuit breakers upon disturbance of the field symmetry in said devices to effect selective disconnection thereof from said line.

5. In a system for selectively protecting electrical devices from short circuits and other disturbances, a polyphase line, a plurality of polyphase electrical devices each having a neutral point, said devices being connected in parallel to said line, circuit breakers interposed between said devices and said line, a transformer structure connected between said line and the neutral points of said devices, a current coil connected between the neutral point of said devices and the neutral point of the primary windings of said transformer structure, and means connected with the secondary windings of said transformer structure for causing actuation of one of said circuit breakers upon the occurrence of a disturbance in the field symmetry in the one of said devices connected thereto.

6. In a system for selectively protecting electrical devices from short circuits and the like, a polyphase line, a plurality of polyphase electrical devices each having a neutral point, said devices being connected to said line, circuit breakers interposed between said devices and said line, a transformer structure connected between said line and the neutral points of said devices, a current coil connected between the neutral point of each of said devices and the neutral point of the primary windings of said transformer structure, voltage coils connected with the secondary windings of said transformer structure, and means connected with said current coils and said voltage coils for causing actuation of one of said circuit breakers upon the occurrence of a disturbance in the field symmetry in the one of said devices connected therewith.

7. In a system for selectively protecting electrical devices from continuing short circuits, a polyphase line, a plurality of polyphase electrical devices having a neutral point, said devices being connected in parallel to said line, circuit breakers for disconnecting said devices from said line, a transformer structure connected between said line and the neutral point of said devices, a current coil connected between the neutral point of each of said devices and the neutral point of the primaries of said transformed structure, voltage coils connected with the secondaries of said transformer structure, a coil for each of said circuit breakers for causing the release thereof, and an armature controlling energization of said circuit breaker releasing coils, said armature being operable by the cooperation of said current and said voltage coils.

8. In a system for selectively protecting electrical devices from the effects of short circuits, a polyphase line, a plurality of polyphase electrical devices having a neutral point, said devices being connected in parallel to said lines, circuit breakers for disconnecting said devices from said line, a transformer structure connected between said line and the neutral point of said devices, said transformer structure having a neutral point connected with the neutral point of said devices, and means connected with said transformer structure and said circuit breakers for causing selective actuation thereof upon disturbance of the field symmetry in said devices to effect selective disconnection of said devices from said line.

9. In a system for selectively protecting electrical devices from the effects of short circuits, a polyphase line, a plurality of polyphase electrical devices each having a neutral point, said devices being connected in parallel with said line, circuit breakers interposed between said devices and said lines, a transformer structure connected between said line and said devices, the secondary windings of said transformer structure being delta connected, a resonant circuit tuned to the third harmonic connected across the secondaries of said transformer structure, and means connected with the secondaries of said transformer structure and said circuit breakers for permitting actuation thereof upon the occurrence of a disturbance in the field symmetry in one of said devices.

In testimony whereof I have hereunto subscribed my name this 30th day of December A. D. 1929.

JULIUS JONAS.